No. 851,958. PATENTED APR. 30, 1907.
W. L. PERKINS & S. W. JENNEY.
SELF OILING BUSHING.
APPLICATION FILED MAR. 24, 1906.
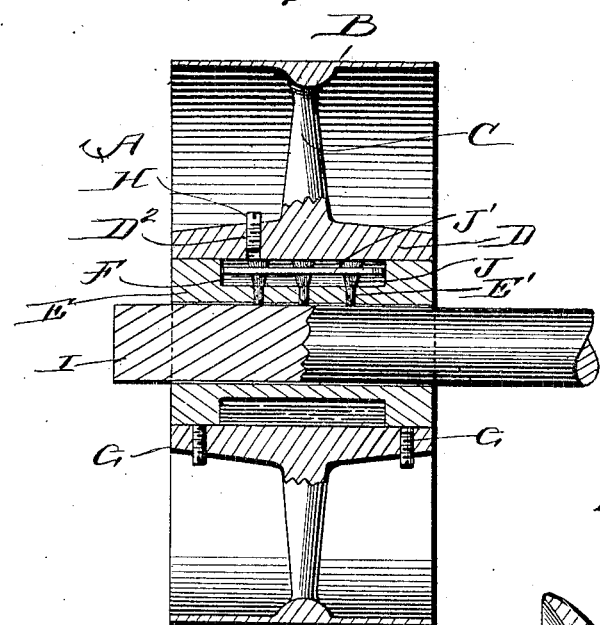
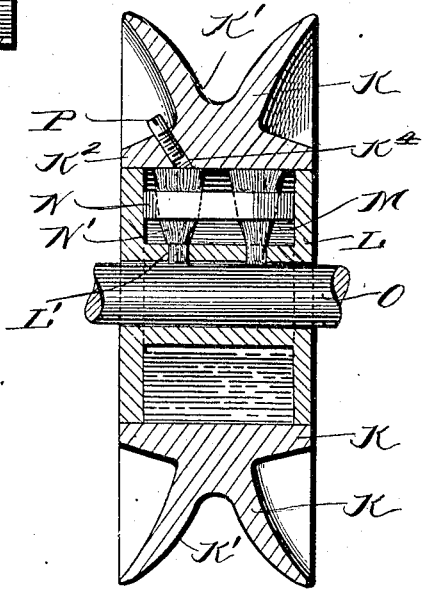
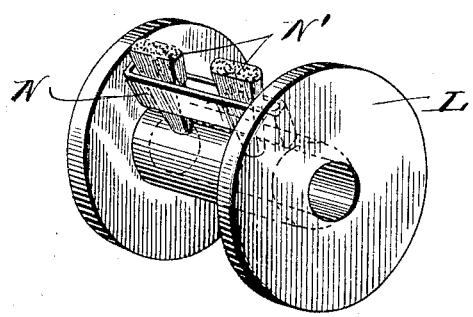
WITNESSES:
W. A. Williams
Ara P. Cbright
INVENTORS
W. L. Perkins,
S. W. Jenney,
BY
O'Meara & Brock
ATTORNEYS

UNITED STATES PATENT OFFICE.

WILLIAM L. PERKINS AND SILAS W. JENNEY, OF BARRE, VERMONT.

SELF-OILING BUSHING.

No. 851,958.  Specification of Letters Patent.  Patented April 30, 1907.

Application filed March 24, 1906. Serial No. 307,853.

*To all whom it may concern:*

Be it known that we, WILLIAM L. PERKINS and SILAS W. JENNEY, citizens of the United States, residing at Barre, in the county of Washington and State of Vermont, have invented a new and useful Improvement in Self-Oiling Bushings, of which the following is a specification.

This invention relates to pulleys and more particularly to self oiling bushing for pulleys, the object being to provide very simple and efficient means for keeping the axle or shaft oiled at all times without waste of oil.

Another object of our invention is to provide the pulley with an oil chamber having a loop arranged therein supporting wicks bearing against the axle or shaft and adapted to convey the oil from the chamber to the same.

The invention consists of the novel features of construction, combination and arrangement of parts, hereinafter fully described and pointed out in the claims.

In the drawings forming a part of this specification:—Figure 1 is a sectional view of a flat pulley. Fig. 2 is a sectional view of a grooved pulley. Fig. 3 is a perspective view of the bushing of the pulley shown in Fig. 2, detached.

In Fig. 1, we have shown a flat pulley A, consisting of a rim B, connected by spokes C, to a hub D, in which a flanged bushing E, forming an oil chamber F between the hub D and bushing E, is adapted to be secured by set-screws G, passing through threaded openings in the hub D, and bearing against the flanges of the bushing E. A threaded opening $D^2$, extends through the hub D, into the oil chamber F, through which the chamber is adapted to be filled and is closed by a threaded plug H. The bushing E, is adapted to be mounted on a shaft I, and secured between the flanges of the bushing E, is a metal loop J', carrying spaced wicks J, which extend through spaced openings E', formed in the bushing and bear against the shaft I.

In Fig. 2, we have shown a grooved pulley consisting of a rim K, having a peripheral groove K', and side flanges $K^2$, in which a flanged bushing L, is secured forming an oil chamber M between the rim K and bushing L. A metal loop N, is secured between the flange of the bushing L, carrying spaced wicks, N' which project through spaced openings L', formed in the hub, and bear against the axle O, upon which the bushing is mounted. A threaded opening $K^4$, is formed in the flange $K^2$, communicating with the oil chamber M, through which oil is adapted to be inserted into the chamber and is closed by a threaded plug P.

From the foregoing description it will be seen that we have provided the pulley with novel and effective means for keeping the axle or shaft oiled, as it can be readily seen that the wicks will be thoroughly saturated with oil as they pass under the axle or shaft, and will feed the oil onto the axle or shaft as they pass over the same.

Having thus fully described our invention, what we claim as new and desire to secure by Letters Patent is:—

1. In a device of the kind described, the combination with an axle, of a pulley mounted on said axle, and having an annular chamber, a loop arranged in said chamber and a wick supported in said chamber by said loop, for the purpose described.

2. In a device of the kind described, the combination with an axle, of a pulley mounted on said axle, and provided with a central opening, a bushing arranged in said opening, said bushing and pulley co-operating to form an annular chamber, a loop arranged in said bushing and wicks supported by said loop in said chamber, for the purpose described.

3. In a device of the kind described the combination with an axle, of a flanged bushing mounted on said axle, a rim secured on said bushing and a loop carrying wicks secured between the flanges of the bushing for the purpose described.

4. In a device of the kind described the combination with a flanged bushing and a rim carried thereby, said bushing and rim co-operating to form an annular chamber, of a loop secured between the flanges of said bushing and wicks arranged in said loop and extending through said bushing for the purpose described.

5. In a device of the kind described, the combination with a flanged bushing, provided with spaced openings and mounted on an axle of a rim secured on said flanged bushing, said bushing and rim co-operating to form an annular chamber, said rim being provided with an opening leading into said chamber, a loop secured between the flanges of the bushing and wicks secured in said loop adapted to extend out through the openings in the bushing and bear against the axle, for the purpose described.

WILLIAM L. PERKINS.
SILAS W. JENNEY.

Witnesses:
ELWIN L. SCOTT,
WEBSTER R. LAIRD.